(12) United States Patent
Bhagwat et al.

(10) Patent No.: US 10,642,809 B2
(45) Date of Patent: May 5, 2020

(54) IMPORT, EXPORT, AND COPY MANAGEMENT FOR TIERED OBJECT STORAGE

(71) Applicant: International Business Machines Corporation, Armonk, NY (US)

(72) Inventors: Deepavali M. Bhagwat, Cupertino, CA (US); Nilesh P. Bhosale, Pune (IN); Joseph W. Dain, Vail, AZ (US); James Hewitt, Hursley (GB); Wayne A. Sawdon, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 15/633,599

(22) Filed: Jun. 26, 2017

(65) Prior Publication Data
US 2018/0373745 A1    Dec. 27, 2018

(51) Int. Cl.
*G06F 16/00*    (2019.01)
*G06F 16/22*    (2019.01)
*G06F 16/955*    (2019.01)

(52) U.S. Cl.
CPC ........ *G06F 16/2272* (2019.01); *G06F 16/955* (2019.01)

(58) Field of Classification Search
CPC .................... G06F 16/2272; G06F 16/955
See application file for complete search history.

(56) References Cited

U.S. PATENT DOCUMENTS

| | | | |
|---|---|---|---|
| 5,862,342 A * | 1/1999 | Winter | G08B 13/19604 709/231 |
| 8,117,235 B1 | 2/2012 | Barta | |
| 9,262,275 B2 | 2/2016 | Gokhale et al. | |
| 10,405,786 B2 * | 9/2019 | Sahin | G16H 20/40 |
| 2008/0306970 A1 * | 12/2008 | Gilman | G06F 16/254 |
| 2010/0332479 A1 * | 12/2010 | Prahlad | G06F 3/0649 707/741 |

(Continued)

FOREIGN PATENT DOCUMENTS

WO    03/017022 A2    2/2003

OTHER PUBLICATIONS

Balasubramanian et al., "A Review on Cloud Data Sotrage in Virtual Perspective," Journal of Computing and Information Technology, Aug. 2014, pp. 1-6.

*Primary Examiner* — Jean M Corrielus
(74) *Attorney, Agent, or Firm* — Zilka-Kotab, P.C.

(57) ABSTRACT

In one embodiment, a method includes receiving, at a centralized index operating in a cloud environment via a messaging bus, first events spawned by a first processor managing an object store accessible via the cloud environment. The method also includes receiving, at the centralized index, second events spawned by a second processor managing an archival store accessible via the cloud environment. Also, the method includes normalizing metadata in the first and second events. Moreover, the method includes indexing and storing the metadata in the centralized index. The object store and the archival store operate in different object subsystems of the cloud environment. Other systems, methods, and computer program products are described for managing import, export, and copy of data within a public tiered object storage environment in accordance with more embodiments.

15 Claims, 6 Drawing Sheets

(56) References Cited

U.S. PATENT DOCUMENTS

| | | |
|---|---|---|
| 2010/0332818 A1* | 12/2010 | Prahlad ............... H04L 67/1097 713/150 |
| 2010/0333116 A1* | 12/2010 | Prahlad ................. G06F 3/0649 719/328 |
| 2011/0258225 A1 | 10/2011 | Taylor et al. |
| 2013/0238572 A1* | 9/2013 | Prahlad ................. G06F 3/0649 707/692 |
| 2015/0293984 A1 | 10/2015 | Zolotusky, Jr. et al. |
| 2015/0331632 A1* | 11/2015 | Slik ........................... G06F 9/54 711/154 |
| 2016/0011816 A1 | 1/2016 | Aizman |
| 2017/0134490 A1* | 5/2017 | Vallabhaneni ...... H04L 67/1095 |

* cited by examiner

IMPORT, EXPORT, AND COPY MANAGEMENT FOR TIERED OBJECT STORAGE

BACKGROUND

The present invention relates to object storage usage and management, and more particularly, to managing import of data to, export of data from, and copy of data within a tiered object storage environment.

A tiered object storage system, such as a public object store, is often used in cloud storage solutions where large quantities of data are to be stored for access from multiple different nodes or servers. In cloud storage solutions, there may be several different performance tiers that are offered to different customers and/or users, often with corresponding price increases for use of higher performance storage infrastructure.

However, when data is to be migrated between different tiers of a tiered object storage, issues may arise as to how to handle such data migration when the data is moved between object stores with different performance characteristics, which may demand different pricing for the customer/user, in a seamless, fully integrated manner. Although data migration or tiering within a single name space is provided in some conventional solutions, no such solution exists for tiering between different name spaces. The issues that occur include how to keep track of locations of the data transparently to an accessing application, how to move the data between object storage tiers and track the movement, and how to scale any solution across a cloud storage solution for use by all customers/users.

SUMMARY

In one embodiment, a method includes receiving, at a centralized index operating in a cloud environment via a messaging bus, first events spawned by a first processor managing an object store accessible via the cloud environment. The method also includes receiving, at the centralized index, second events spawned by a second processor managing an archival store accessible via the cloud environment. Also, the method includes normalizing metadata in the first and second events. Moreover, the method includes indexing and storing the metadata in the centralized index. The object store and the archival store operate in different object subsystems of the cloud environment.

In another embodiment, a computer program product includes a computer readable storage medium having program instructions embodied therewith. The computer readable storage medium is not a transitory signal per se. Also, the embodied program instructions are executable by a processing circuit to cause the processing circuit to receive, by the processing circuit at a centralized index operating in a cloud environment via a messaging bus, first events spawned by a first processor managing an object store accessible via the cloud environment. In addition, the embodied program instructions cause the processing circuit to receive, by the processing circuit at the centralized index, second events spawned by a second processor managing an archival store accessible via the cloud environment. Also, the embodied program instructions cause the processing circuit to normalize, by the processing circuit, metadata in the first and second events. Moreover, the embodied program instructions cause the processing circuit to index and store, by the processing circuit, the metadata in the centralized index. The object store and the archival store operate in different object subsystems of the cloud environment.

In another embodiment, a system includes a processing circuit, a memory, and logic stored to the memory, that when executed by the processing circuit causes the processing circuit to receive, by the processing circuit at a centralized index operating in a cloud environment via a messaging bus, first events spawned by a first processor managing an object store accessible via the cloud environment. The logic also causes the processing circuit to receive, by the processing circuit at the centralized index, second events spawned by a second processor managing an archival store accessible via the cloud environment. Also, the logic causes the processing circuit to normalize, by the processing circuit, metadata in the first and second events. Moreover, the logic causes the processing circuit to index and store, by the processing circuit, the metadata in the centralized index. The object store and the archival store operate in different object subsystems of the cloud environment, and the cloud environment includes a heterogeneous storage environment that includes the object store and the archival store.

Other aspects and embodiments of the present invention will become apparent from the following detailed description, which, when taken in conjunction with the drawings, illustrate by way of example the principles of the invention.

DETAILED DESCRIPTION

Figure 1:
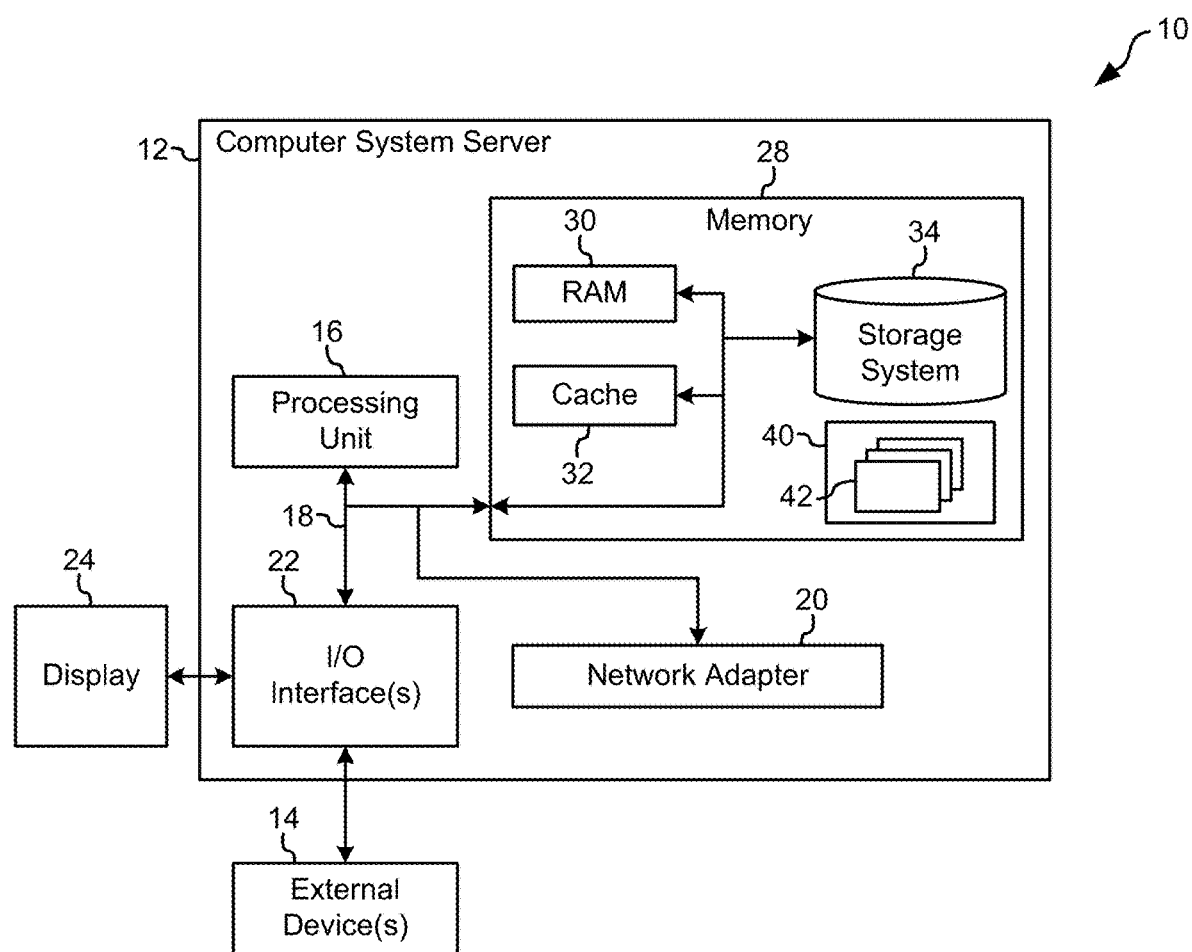
FIG. 1 depicts a cloud computing node according to an embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "about" as used herein indicates the value preceded by the term "about," along with any values reasonably close to the value preceded by the term "about," as would be understood by one of skill in the art. When not indicated otherwise, the term "about" denotes the value preceded by the term "about"±10% of the value. For example, "about 10" indicates all values from and including 9.0 to 11.0.

The following description discloses several preferred embodiments of systems, methods, and computer program products for management and use of public tiered object storage environments.

In one general embodiment, a method includes receiving, at a centralized index operating in a cloud environment via a messaging bus, first events spawned by a first processor managing an object store accessible via the cloud environment. The method also includes receiving, at the centralized index, second events spawned by a second processor managing an archival store accessible via the cloud environment. Also, the method includes normalizing metadata in the first and second events. Moreover, the method includes indexing and storing the metadata in the centralized index. The object store and the archival store operate in different object subsystems of the cloud environment.

In another general embodiment, a computer program product includes a computer readable storage medium having program instructions embodied therewith. The computer readable storage medium is not a transitory signal per se. Also, the embodied program instructions are executable by a processing circuit to cause the processing circuit to receive, by the processing circuit at a centralized index operating in a cloud environment via a messaging bus, first events spawned by a first processor managing an object store accessible via the cloud environment. In addition, the embodied program instructions cause the processing circuit to receive, by the processing circuit at the centralized index, second events spawned by a second processor managing an archival store accessible via the cloud environment. Also, the embodied program instructions cause the processing circuit to normalize, by the processing circuit, metadata in the first and second events. Moreover, the embodied program instructions cause the processing circuit to index and store, by the processing circuit, the metadata in the centralized index. The object store and the archival store operate in different object subsystems of the cloud environment.

In another general embodiment, a system includes a processing circuit, a memory, and logic stored to the memory, that when executed by the processing circuit causes the processing circuit to receive, by the processing circuit at a centralized index operating in a cloud environment via a messaging bus, first events spawned by a first processor managing an object store accessible via the cloud environment. The logic also causes the processing circuit to receive, by the processing circuit at the centralized index, second events spawned by a second processor managing an archival store accessible via the cloud environment. Also, the logic causes the processing circuit to normalize, by the processing circuit, metadata in the first and second events. Moreover, the logic causes the processing circuit to index and store, by the processing circuit, the metadata in the centralized index. The object store and the archival store operate in different object subsystems of the cloud environment, and the cloud environment includes a heterogeneous storage environment that includes the object store and the archival store.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
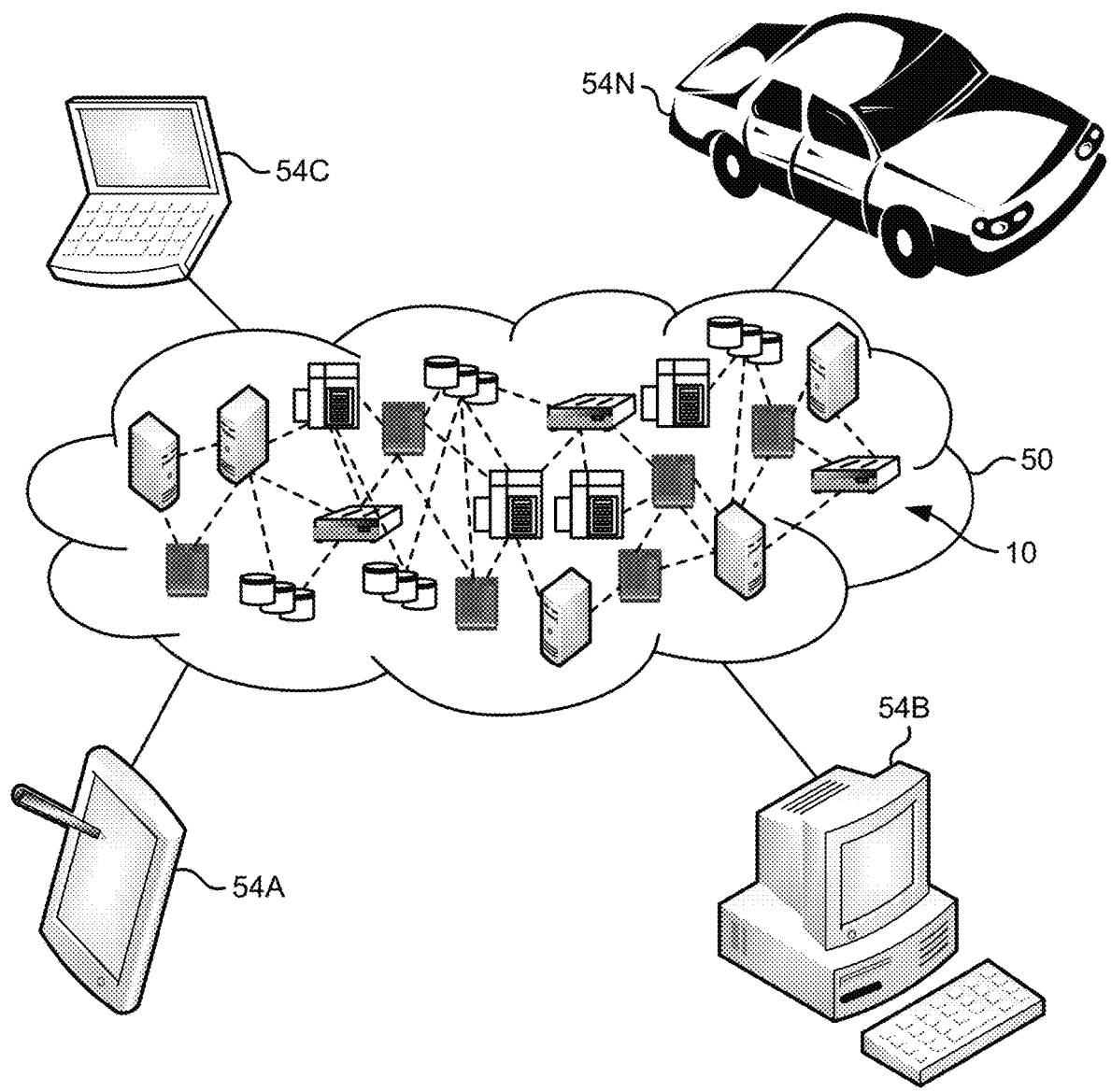
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
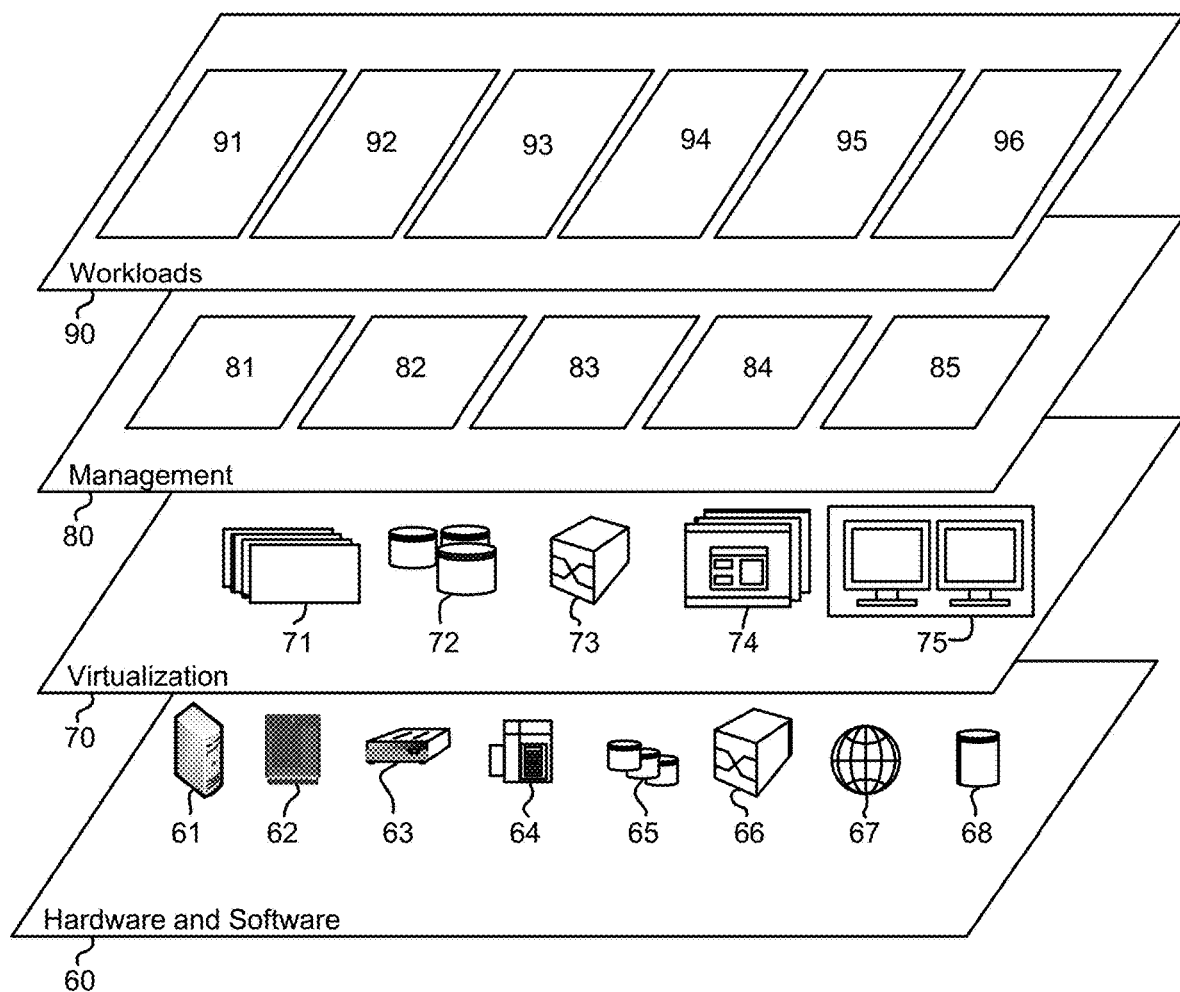
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and public tiered object store management 96.

Figure 4:
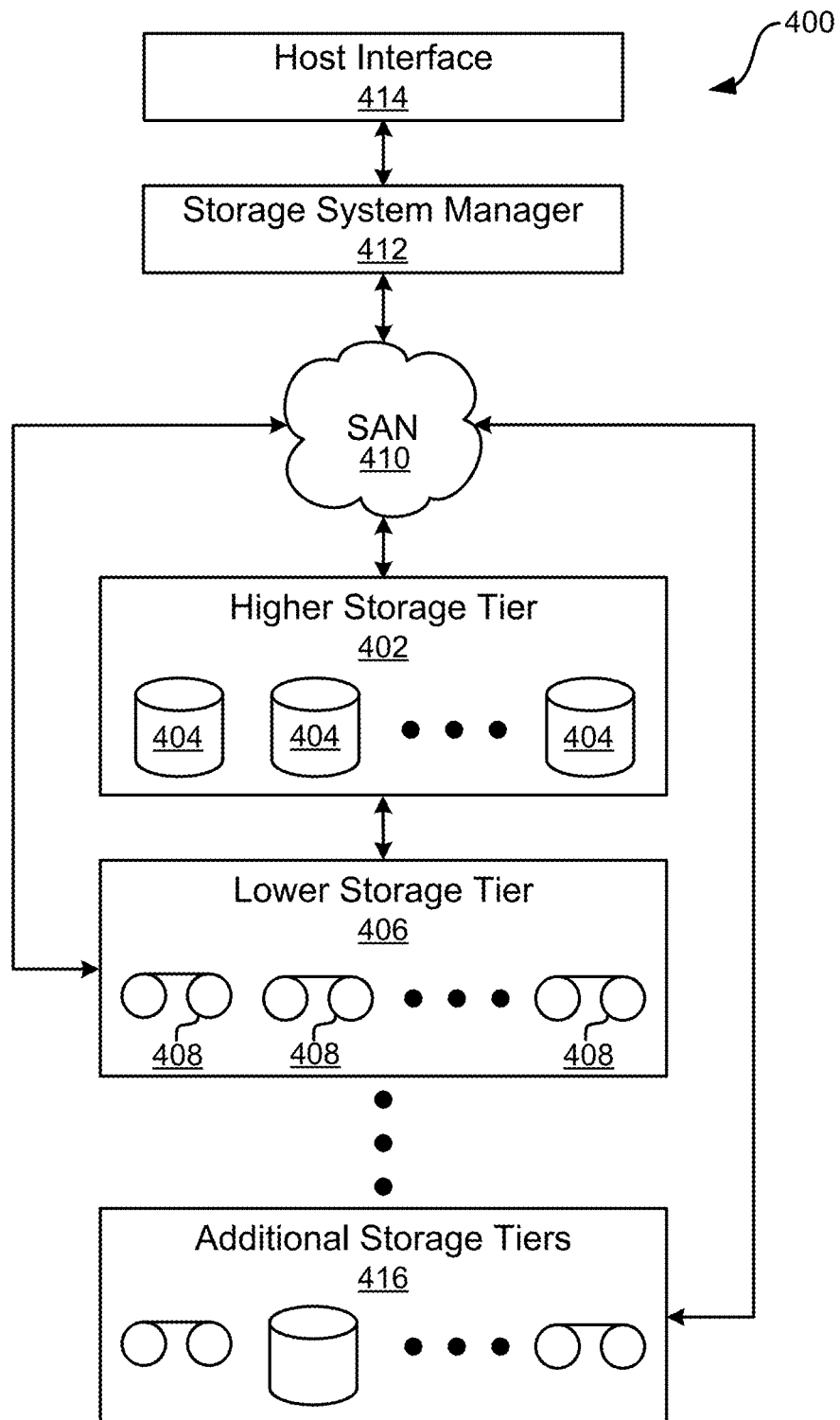
FIG. 4 illustrates a tiered data storage system in accordance with one embodiment.

Now referring to FIG. 4, a tiered storage system 400 is shown according to one embodiment, which may be representative of a public tiered object store in some approaches. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as nonvolatile memory (NVM), solid state memory in solid state drives (SSDs), flash memory, SSD arrays, flash memory arrays, hard disks in hard disk drives (HDDs), etc., and/or others noted herein or known in the art. The lower storage tier(s) 406 may preferably include one or more lower performing storage media 408, including slower accessing HDDs, sequential access media such as magnetic tape in tape drives and/or optical media, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media (up to and including all SSD storage media) for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

In one particular embodiment, the storage system 400 may include a combination of SSDs and HDDs, with the higher storage tier 402 including SSDs (and possibly some buffer memory) and the lower storage tier 406 including HDDs (and possibly some buffer memory). According to another embodiment, the storage system 400 may include a combination of SSDs and magnetic tape with magnetic tape drives, with the higher storage tier 402 including SSDs (and possibly some buffer memory) and the lower storage tier 406 including higher latency media, such as magnetic tape (and possibly some buffer memory) and magnetic tape drives for accessing data from the magnetic tapes. In yet another embodiment, the storage system 400 may include a combination of HDDs and magnetic tape, with the higher storage tier 402 including HDDs (and possibly some buffer memory) and the lower storage tier 406 including magnetic tape (and possibly some buffer memory).

Management and use of integrated, tiered object storage environments may be enhanced and improved using techniques described herein in various embodiments. Any integrated, tiered object storage environment may be used in the context of the present embodiments, and may include any number of suitable different systems, architectures, and protocols, as would be apparent to one of skill in the art. For example, as a higher cost, higher performing object storage tier, any known highly available cloud storage solution may be used, such as IBM® Cloud Object Storage System™, NetApp® StorageGRID® Webscale, Dell EMC™ Elastic Cloud Storage™, etc. In another example, as a lower cost, lower performing permanent object storage tier, any known long term object storage solution may be used, such as IBM® Spectrum Archive™, Dell EMC™ Atmos® Storage, etc. The higher performing tier and the lower cost tier may be integrated together in any suitable public cloud solution that provides the ability to move data between the higher performing tier and the lower cost tier, such as IBM® Softlayer®, Virtustream® Storage Cloud, etc.

Typically, an object storage environment stores data within individual tiers of the environment along with metadata relating to the layout of the data on the file system in index nodes (inodes) of the file system. The object storage target does not have a concept of data storage tiers, and instead is only configured to store objects and their associated metadata. When storing data to a conventional object storage, the metadata in the mode of the file system is extracted and may be stored as object metadata. Also, a "cloud directory" may be created in the object store which includes the metadata describing the layout of the data on the file system. When importing data, a user data portion of the objects is imported and the metadata portion of the objects is queried from an archive manager which are stored in the inodes of the file system.

This conventional method of managing data in tiered object storage environments does not scale to levels that are used in public cloud storage and in large private cloud storage deployments. By storing the metadata in the inodes and also in the file system metadata, two copies of the metadata are created and stored, which is inefficient at scale. For example, querying the inodes of the file system at scale would negatively impact cloud object store performance. Therefore, many customers/users turn off or otherwise restrict metadata indexing because it does not perform well at scale. This conventional method of managing data in tiered object storage environments also does not provide an easy method to determine a location of data, since two metadata locations are queried in order to determine whether a difference exists between the reported locations, and then reconcile the differences.

Figure 5:
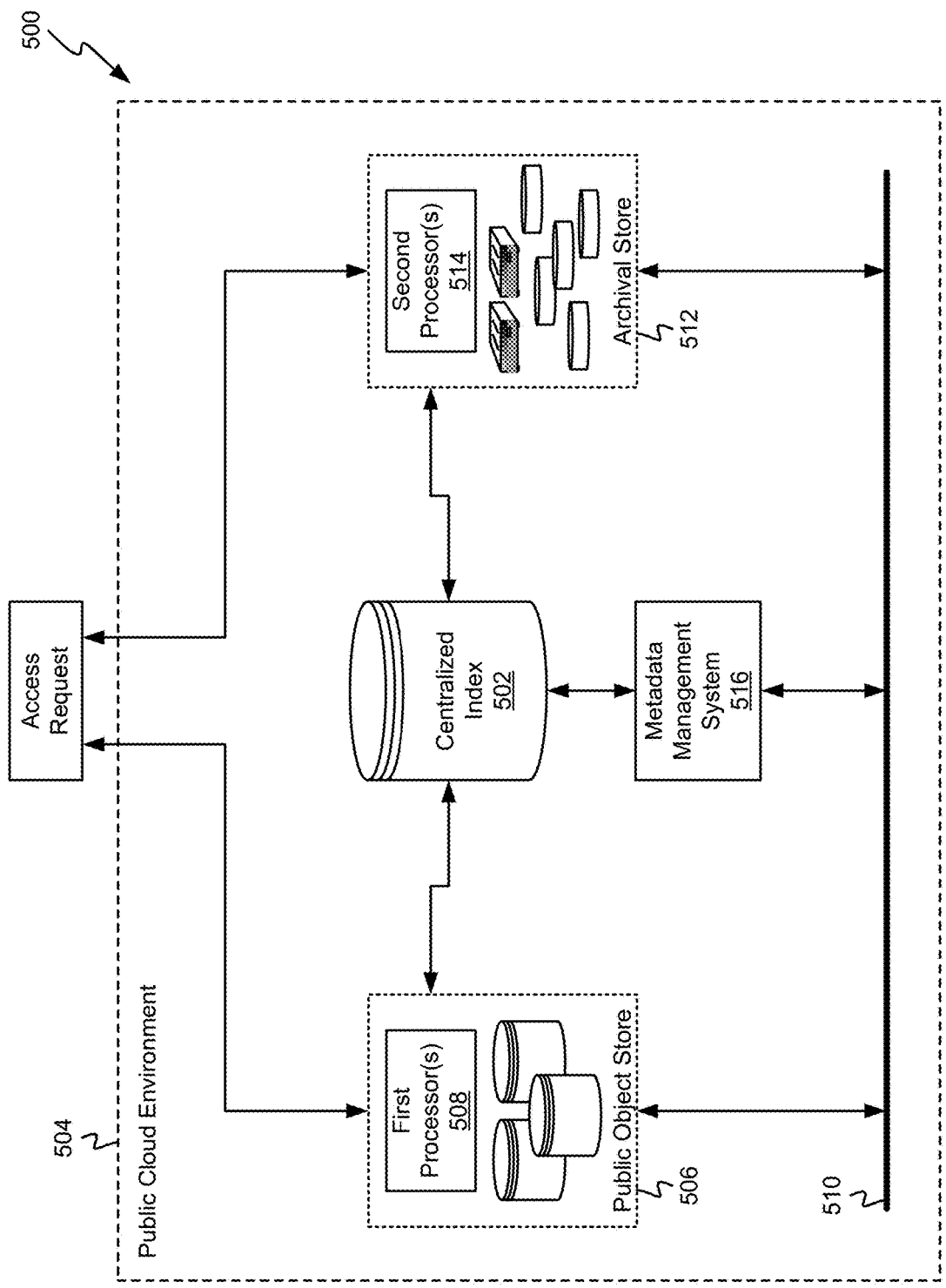
FIG. 5 shows a storage environment, according to one embodiment.

Now referring to FIG. 5, a storage environment 500 that overcomes the drawbacks and issues with conventional methods of managing data in tiered object storage environments is described in accordance with one embodiment. The storage environment 500 employs a highly-scalable centralized index 502, sometimes referred to herein as a "meta ocean," that runs in a cloud environment 504. Events are sent from a first processor 508 configured to manage the object store 506 to the centralized index 502 for operations on data stored to the object store 506, such as PUT, POST, COPY, DELETE, etc., which are put into a highly-scalable messaging hub 510. In one embodiment, the first processor 508 may execute an instance of IBM® Cloud Object Storage System™ or some other suitable platform known in the art. In another embodiment, the messaging hub 510 may utilize the IBM® Message Hub operating with the Apache™ Kafka messaging system or some other suitable messaging hub known in the art.

The events, which may be sent as messages, are consumed and converted into metadata, such as by Docker™ containers or some other suitable platform known in the art. After conversion into useable and normalized metadata, the metadata is indexed into the centralized index 502, such as via ElasticSearch® or some other suitable platform known in the art.

In a further embodiment, second events relating to data operations pertaining to data stored on or being stored to one or more storage media of an archival store 512 are sent by a second processor 514 configured to manage the archival store 512 to the centralized index 502, consumed and converted into metadata, and stored to the centralized index 502. The second processor 514 may execute an instance of IBM® Spectrum Archive™, or some other suitable platform known in the art.

This provides a consistent metadata view in the centralized index 502 of the placement of data (e.g., objects) in the object store 506 and data (e.g., containers) in the archival store 512.

Moreover, in response to an application indicating that data is to be migrated between the object store 506 and the archival store 512, a custom object metadata key may be passed between the stores. The custom object metadata key may be referred to as "data_placement_operation" and the value of this custom object metadata key may be set to indicate a migration operation during a POST or PUT call. This causes an event to be generated by the first processor 508 which is placed into the messaging hub 510. After placement into the messaging hub 510, an indication of success or failure is returned for the POST or PUT operation. A metadata management system 516, running in a Docker™ container in one embodiment, scans the message from the messaging hub 510 and, in addition to indexing the event in the centralized index 502, also scans for the custom object metadata key "data_placement_operation" and what value it is set to, such as "migrate." In response to a determination that the custom object metadata key is set to "migrate," a new event is generated on a queue or on a different messaging hub 510 topic. The message includes the source bucket and objects to be migrated as well as the destination bucket and object name.

The metadata management system 516 picks up the message and extracts the details about the source and target and also issues a query to determine the address (such as IP address) and credentials for the target in the archival store 512. In an alternate embodiment, the target bucket and object is not specified by the application and is derived using a naming convention that is pre-ordained and well-defined for such determinations. For example, an IBM® Cloud Object Storage System™ bucket may be called "container1" and an associated IBM® Spectrum Archive™ bucket may be called "container1_archive," thereby indicating the association therebetween with the similar naming convention.

The metadata management system 516 may also obtain (such as via a GET operation) the object from the object store 506, with the first processor 508 generating an event in response to the object being obtained. This event is obtained by the centralized index 502 and content of the event (metadata) is updated in the centralized index 502 according to one embodiment. In another embodiment, data from the GET operation may be written to a scratch space (cache memory address or similar) and in response, a PUT call is utilized to read the data from the scratch space. In an alternate embodiment, the data from the GET call may be retained in memory and passed to the PUT call without invoking memory I/O operations on any of the memories of the object store 506 or the archival store 512.

The migration operation puts the object to the archival store 512, while the second processor 514 generates an event which is obtained by the metadata management system 516 and indexed into the centralized index 502 in this embodiment. Next, a data mover, such as a container configured for data movement, deletes the object from the object store 506 which generates an event via the first processor 508 and the content is indexed into the centralized index 502. Moreover, the data mover may validate the consistency of the operation in the centralized index 502 by ensuring that records of the operation are indexed into the centralized index 502 in a further embodiment.

According to another specific embodiment, an Openwhisk microservice may be registered to trigger upon detecting a message being place to an Openwhisk migrate_recall topic. For recall, a POST command may be sent to Cloud Object Storage System™ with the data_placement_operation field set to recall and a similar procedure to migrate takes place but in reverse to get the data from Spectrum Archive™, PUT the data to Cloud Object Storage System™, and delete the copy from Spectrum Archive™.

In response to the data being in Spectrum Archive™ and not in Cloud Object Storage System™, a request to GET the object from Cloud Object Storage System™ may fail with "403 Forbidden" or similar warning—indicating that the operation is not valid for the Cloud Object Storage System™ tier. Applications may check the location of objects by doing a HEAD on the bucket and objects from Cloud Object Storage System™. The HEAD requests, in one embodiment, may be intercepted by the Cloud Object Storage System™ accessor node which issues queries against the centralized index 502 to get the details of the tiered object storage view of data between Cloud Object Storage System™ and Spectrum Archive™. In response to the custom metadata field data_placement being set to migrated, it indicates that the data is stored in Spectrum Archive™. Applications may issue a POST command to set the data_placement_operation to recall, which triggers the recall activity described above. Once the data is in the Cloud Object Storage System™ tier, the GET call will succeed.

Spectrum Archive™ also intercepts POST and GET calls, such as via Openstack® Swift middleware or similar in the proxy node, and issues centralized index 502 queries such that applications may retrieve data directly from the Spectrum Archive™ tier as opposed to having to first move it back to Cloud Object Storage System™.

Moreover, a data_placement_operation_status custom metadata key may be used to indicate the progress of migrate and recall activities. The Openwhisk and/or Kafka consumers update the field in ElasticSearch® as the operation progresses.

In a storlet-based method, according to an alternate embodiment, storlets may be leveraged as the data movers, as opposed to Openwhisk microservices, Kafka consumers, etc. In this case, storlets are registered in the Openstack® Swift layer to trigger migrate and recall activity between Cloud Object Storage System™ and Spectrum Archive™ and the centralized index 502 consumer issues POST commands to the Spectrum Archive™ layer which trigger the storlets to move data.

In another alternate embodiment, a MCStore gateway embedded in Cloud Object Storage System™ and Spectrum Archive™ may perform the data movement and update the centralized index 502 according to the location.

Also, a copy export function allows customers to create a copy of the data from one object storage class, export it to another object storage class, update the centralized index 502 to indicate the location of both copies, and set a time to remove the copies in response to a determination that one or more of the copies are no longer needed.

Alternatively, users may manually remove the copies in response to a determination that one or more of the copies are no longer needed. Moreover, in response to an application requesting creation of a copy of data for exporting to a different tier in the storage environment 500, the application may pass custom object metadata key(s) set to copy_export, target_url, with values thereof set to an access point for the target object on a storage subsystem storing the target object, a target bucket, target object name(s), and the expiration date or an expiration timer which defines when to expire the copy of the data, such as during a POST call. This causes an event to be generated by a node of the object store 506 that is put into the messaging hub 510. After the event is successfully inserted into a queue of the messaging hub 510, success is returned to the application POST request. A consumer on the messaging hub 510, running in a docker container in one embodiment, such as the metadata management system 516, gets the message, indexes the message content into the centralized index 502, and checks to determine whether the data_placement operation is set to copy export. In response to determining that the data_placement operation is set to copy export, a new event is generated on a queue, such as an IBM® Openwhisk queue, or on a different messaging hub 510 topic (e.g., a Kafka topic) called "data_movement." The message may include the source bucket and objects to duplicate, as well as the destination target_url, bucket, and object name(s).

In one embodiment, an Openwhisk consumer, Kafka consumer, other consumer on the messaging hub 510 (e.g., the metadata management system 516) gets the message and extracts the details about the source and target. In an alternate embodiment, the target_url may be derived by issuing a query, such as an ElasticSearch® query, to determine the IP and credentials for the target. In an alternate embodiment the target bucket and object (in response to not being specified by the application) may be derived programmatically using a well-defined naming convention. For example, a Cloud Object Storage System™ bucket may be called "container1" and the associated Spectrum Archive™ bucket may be called "container1_archive."

The Kafka consumer may utilize a Cloud Object Storage System™ REST API (S3. Swift) to GET the object or objects from Cloud Object Storage System™ which generates an event. In one embodiment, the data from the GET is written to a scratch space and then the PUT call reads the data from the scratch space. In an alternate embodiment, data from the GET call is retained in memory and passed to the PUT call without having to invoke storage memory I/O. The message for this event is obtained and content thereof is indexed into the centralized index 502. Next, a consumer puts the object to Spectrum Archive™ which generates an event. The message for this event is obtained and content thereof is indexed into the centralized index 502. The consumer may validate the consistency of the operation in the centralized index 502 (checks to see that the events are persisted) and updates the centralized index 502 with the expiration date of the export in one approach. Also, the object is PUT to Spectrum Archive™. In an alternate embodiment, an Openwhisk microservice may be registered to trigger upon receiving the event generated by the Kafka consumer across the messaging hub 510 which performs the same operations as described above for the Kafka consumer.

Also, a similar operation, but in reverse, may be used to create copies of data from Spectrum Archive™ to Cloud Object Storage System™. When the extra copy of the data is no longer needed, an event may be generated which triggers an Openwhisk action in Bluemix® that deletes the extra copy in Cloud Object Storage System™ and updates the centralized index 502. Moreover, a background process may issue queries to ElasticSearch® looking at the expiration_date field to see if it is expired. In response to a determination that the expiration_date or expiration timer is expired, the target_url, bucket and object are extracted from ElasticSearch® and the object is deleted.

Figure 6:
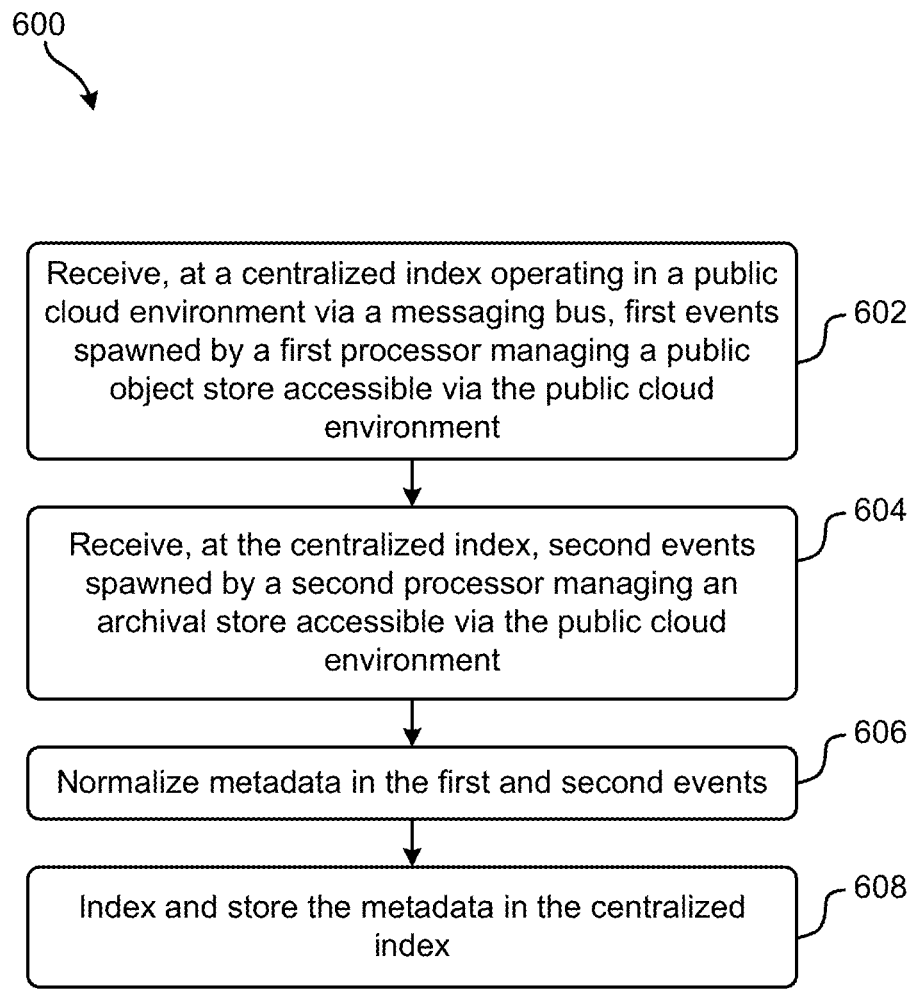
FIG. 6 shows a flowchart of a method, according to one embodiment.

Now referring to FIG. 6, a method 600 is shown according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a microprocessor, a server, a mainframe computer, a processing circuit having one or more processors therein, or some other device comprising one or more processors. The processing circuit, e.g., processor(s), chip(s), and/or module(s) implemented in hardware and/or software, and preferably having at least one hardware component, may be utilized in any device to perform one or more steps of the method 600. Illustrative processors include, but are not limited to, a MPU, a CPU, an ASIC, a FPGA, etc., combinations thereof, or any other suitable computing device known in the art.

As shown in FIG. 6, method 600 may start with operation 602, where first events spawned by a first processor managing an object store accessible via a public cloud environment are received at a centralized index operating in the public cloud environment via a messaging bus.

The messaging bus may be a highly scalable messaging bus that is suitable for handling multiple spawned events in an efficient manner, such as IBM® Message Hub operating with the Apache™ Kafka messaging system according to one embodiment.

A first event, in one embodiment, may include indication of an action (e.g., PUT, POST, COPY, DELETE, etc.) performed on data associated with the first event.

The first processor, according to one embodiment, may be any suitable processor, such as a MPU, a CPU, an ASIC, a FPGA, etc., that is configured to manage the object store. The object store, in one embodiment, may include one or more, such as a plurality, of non-volatile memory (NVM) storage devices. Any suitable NVM storage devices may be utilized, such as Flash memory, RAM, erasable programmable read-only memory (EPROM), solid state devices (SSDs), etc. Additionally, a cache or buffer may also be present in the object store for data staging prior to storage on the object store. Moreover, the object store is accessible to specified users via the public cloud environment.

In operation 604, second events spawned by a second processor managing an archival store accessible via the public cloud environment are received at the centralized index.

A second event, in one embodiment, may include indication of an action (e.g., PUT, POST, COPY, DELETE, etc.) performed on data associated with the second event.

The second processor, according to one embodiment, may be any suitable processor, such as a MPU, a CPU, an ASIC, a FPGA, etc., that is configured to manage the archival store. The archival store, in one embodiment, may include higher latency media, such as tape media operable with tape drives, optical media, and shingled magnetic recording (SMR) media. In more embodiments, some mixture of storage devices may be present in the archival store, such as tape drives and tape media, optical drives, shingled magnetic recording (SMR) devices, HDDs, etc. Additionally, a cache or buffer may also be present in the archival store for data staging prior to storage on the archival store. Moreover, the archival store is accessible to specified users via the public cloud environment.

In operation 606, the metadata in the first and second events is normalized, such as via a metadata management system that manages a single metadata namespace across different object subsystems. According to one embodiment, the object store and the archival store may operate in different object subsystems of the public cloud environment. Furthermore, the object store and the archival store may operate in a heterogeneous storage environment, e.g., the object store and the archival store may be provided by different vendors, operate according to different protocols, utilize different data structures and/or architectures, etc. However, the various events (first and second events) are all handled by a single entity, such as the metadata management system, and converted into metadata for storage in the centralized index.

The metadata may include any relevant information that describes data associated with the event. For example, the metadata may include information about an operation that is performed on the data associated with the event (e.g., PUT, POST, COPY, DELETE, etc.), where the data associated with the event is moved, stored, copied to, copied from, if the data is deleted, whether the data is up to date, whether the data is out of date, etc.

In operation 608, the metadata is indexed and stored in the centralized index. By indexing the metadata, what is meant is that the metadata is catalogued or otherwise filed into the centralized index such that the metadata may be retrieved in an expedient manner. Moreover, storage of the metadata indicates that the metadata is saved to a memory or memories that are configured to maintain the centralized index, with the memory or memories being accessible via the public cloud environment.

In one embodiment, the first events and/or the second events individually or in combination, include indication of an action performed on data associated with the first and/or second events, such as PUT, POST, COPY, DELETE, etc.

According to another embodiment, the metadata includes at least one storage location for data associated with the first and/or second events. This storage location may be a virtual or physical location within the object store, such as a memory address, which is a fixed-length sequence of digits conventionally displayed and manipulated as unsigned integers and used to designate a location where specific data may be found.

In another embodiment, method 600 may include receiving a search request for first data. The search request may be issued by any system, device, or instrument which is in communication with and/or within the public cloud environment. The search request, in some embodiments, may not include a known address of the first data. Furthermore, method 600 may include searching the centralized index for metadata relating to a storage location of the first data. Because a storage location of the first data is stored as metadata within the centralized index, this information may be retrieved by accessing the metadata. Method 600 may also include responding to the search request with the storage location for the first data, thereby allowing the issuer of the search request to access the first data either in the object store or in the archival store.

In addition, the storage location for the first data may be reported as being stored on the object store in response to a determination that at least one copy of the first data exists on the object store, thereby allowing faster access to the first data (due to the faster memory types used in the object store). Further, the storage location for the first data may be reported as being on the archival store in response to a determination that at least one copy of the first data exists on the archival store and not on the object store. Although data retrieval from the archival store is typically slower than data retrieval from the object store, if the first data does not exist on the object store, then it is better to retrieve it in a slower manner than not at all. Moreover, the first data may be exported to the object store prior to being accessed, in some additional embodiments.

In another embodiment, method 600 may include receiving an import/export request to move second data stored on the object store or stored to the archival store. An export request may be issued by the object store to move second data stored on the object store to the archival store or by the archival store to move second data stored on the archival store to the object store, while an import request may be issued by the archival store to move second data located in the object store from the object store to the archival store or by the object store to move second data stored on the archival store to the object store. Further, method 600 may include searching the centralized index for metadata relating to a storage location of the second data on the object store. In this way, once the metadata is located in the centralized index, the storage location of the second data may be identified. Thereafter, method 600 may include responding to the import/export request with the storage location for the second data on the object store. Once the storage location for the second data on the object store is sent, another entity, such as a data mover operating in the public cloud environment and having access to the object store, may move the second data from the object store to the archival store using the storage location for the second data on the object store.

According to a further embodiment, method 600 may include receiving, at the centralized index, a second event spawned by the second processor indicating storage of the second data to the archival store. This storage may take place in response to an import/export request. In response to receiving the second event, the centralized index may be updated to reflect a current storage location for the second data on the archival store, which may take place of a previously saved storage location on the object store or may be added to the previously saved storage location on the object store.

In yet another embodiment, method 600 may include setting a timer for maintaining the second data on the object store and performing an operation on the second data (such as deleting, moving, copying, etc., the second data on the object store) in response to expiration of the timer. This timer action may be performed by issuing one or more representational state transfer (REST) application programming interface (API) calls to the object store, each REST API call comprising user-defined metadata. Thereafter, the user-defined metadata may be received as an event in the public cloud environment, and the operation may be automatically performed on the second data at a time specified in the user-defined metadata (such as expiration of a pre-set amount of time).

According to another embodiment, method 600 may include receiving a copy request to duplicate third data stored on the archival store onto the object store. This duplication request is intended to cause a copy of the third data to be made, either on the same store or in a different store. Method 600 may also include searching the centralized index for metadata relating to a storage location of the third data on the archival store, and responding to the copy request with the storage location for the third data on the archival store. Thereafter, another entity, such as the data mover, may be caused to duplicate the third data stored on the archival store onto the object store using the storage location for the third data on the archival store.

In a further embodiment, method 600 may include receiving, at the centralized index, a first event spawned by the first processor indicating copying of the third data to the object store. In response to receiving the first event, the centralized index may be updated to reflect an additional storage location for the third data on the object store. This additional storage location is stored in addition to a previously saved storage location on the archival store.

Of course, data may be copied, moved, imported, and/or exported from either the object store or the archival store in a variety of other embodiments not specifically described herein.

Method 600 may be implemented in a system and/or a computer program product. For example, a system may include a processing circuit and logic integrated with the processing circuit, executable by the processing circuit, or integrated with and executable by the processing circuit. By integrated with, what is meant is that the processing circuit is a hardware processor that has hardcoded logic included therewith, such as an ASIC, a FPGA, etc. By executable by, what is meant is that the processor is configured to execute software logic to achieve functionality dictated by the software logic, with the processor possibly being a MPU, a CPU, a microprocessor, etc. The logic is configured to cause the processing circuit to perform method 600.

In another example, a computer program product may include a computer readable storage medium having program instructions embodied therewith. The computer readable storage medium may be any suitable storage device known in the art that is configured to store and allow computer access to information stored therein. The embodied program instructions are executable by a processing circuit to cause the processing circuit to perform method 600.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, via a messaging bus at a centralized index operating in a cloud environment, a first event indicating an action performed on first data within an object store accessible via the cloud environment;
   receiving, at the centralized index, a second event indicating an action performed on second data within an archival store separate from the object store that is accessible via the cloud environment, where the object store and the archival store operate in different object subsystems of the cloud environment;
   normalizing metadata in the first event and the second event to correspond to a single namespace across the different object subsystems; and
   indexing and storing the normalized metadata in the centralized index, where the normalized metadata includes the action performed on the first data, a storage location of the first data within the object store, the action performed on the second data, and a storage location of the second data within the archival store.

2. The method as recited in claim 1, wherein the object store comprises a plurality of non-volatile memory storage devices, wherein the archival store comprises a plurality of higher latency media, and wherein the object store and the archival store operate in a heterogeneous storage environment.

3. The method as recited in claim 1, wherein the object store and the archival store operate according to different protocols and utilize different data structures and data architectures.

4. The method as recited in claim 1, further comprising:
   receiving a request to move the first data from the object store to the archival store;
   determining the storage location of the first data within the object store, utilizing the centralized index;
   responding to the request with the storage location of the first data within the object store;
   receiving, at the centralized index, a third event indicating a storage of the first data within the archival store;
   setting a timer for maintaining the first data within the object store; and
   deleting the first data within the object store, in response to an expiration of the timer.

5. The method as recited in claim 1, further comprising:
   receiving a search request for third data;
   searching the centralized index for metadata relating to a storage location of the third data; and
   responding to the search request with the storage location for the third data,
   wherein the storage location for the third data is reported on the object store in response to a determination that at least one copy of the third data exists on the object store, and wherein the storage location for the third data is reported on the archival store in response to a determination that at least one copy of the third data exists on the archival store and not on the object store.

6. The method as recited in claim 1, further comprising:
   receiving a request to duplicate the second data within the archival store;
   determining the storage location of the second data within the archival store, utilizing the centralized index;
   responding to the request with the storage location of the second data within the archival store;
   receiving, at the centralized index, a third event indicating a copying of the second data to an additional storage location within the object store;
   adding, to the normalized metadata in the centralized index, the additional storage location of the second data within the object store to the storage location of the second data within the archival store;
   receiving a search request for the second data;
   searching the centralized index for the normalized metadata relating to a storage location of the second data; and
   responding to the search request with the additional storage location within the object store, in response to determining that at least one copy of the second data exists within the object store.

7. The method as recited in claim 1, further comprising:
   receiving a request to move the first data from the object store to the archival store;
   determining the storage location of the first data within the object store, utilizing the centralized index;
   responding to the request with the storage location of the first data within the object store;
   receiving, at the centralized index, a third event indicating a storage of the first data within the archival store;
   setting a timer for maintaining the first data within the object store;
   deleting the first data within the object store, in response to an expiration of the timer;
   receiving a request to duplicate the second data within the archival store;
   determining the storage location of the second data within the archival store, utilizing the centralized index;
   responding to the request with the storage location of the second data within the archival store;
   receiving, at the centralized index, a third event indicating a copying of the second data to an additional storage location within the object store;
   adding, to the normalized metadata in the centralized index, the additional storage location of the second data within the object store to the storage location of the second data within the archival store;

receiving a search request for the second data;
searching the centralized index for the normalized metadata relating to a storage location of the second data; and
responding to the search request with the additional storage location within the object store, in response to determining that at least one copy of the second data exists within the object store.

8. A computer program product, the computer program product comprising a computer readable storage medium having program instructions embodied therewith, wherein the computer readable storage medium is not a transitory signal per se, the embodied program instructions being executable by a processing circuit to cause the processing circuit to:
receive, by the processing circuit via a messaging bus at a centralized index operating in a cloud environment, a first event indicating an action performed on first data within an object store accessible via the cloud environment;
receive, by the processing circuit at the centralized index, a second event indicating an action performed on second data within an archival store separate from the object store that is accessible via the cloud environment, where the object store and the archival store operate in different object subsystems of the cloud environment;
normalize, by the processing circuit, metadata in the first event and the second event to correspond to a single namespace across the different object subsystems; and
index and store, by the processing circuit, the normalized metadata in the centralized index, where the normalized metadata includes the action performed on the first data, a storage location of the first data within the object store, the action performed on the second data, and a storage location of the second data within the archival store.

9. The computer program product as recited in claim 8, wherein the object store comprises a plurality of non-volatile memory storage devices, wherein the archival store comprises higher latency media, and wherein the object store and the archival store operate in a heterogeneous storage environment.

10. The computer program product as recited in claim 8, wherein the object store and the archival store operate according to different protocols and utilize different data structures and data architectures.

11. The computer program product as recited in claim 8, wherein the embodied program instructions are further executable by the processing circuit to cause the processing circuit to:
receive, by the processing circuit, a search request for third data;
search, by the processing circuit, the centralized index for metadata relating to a storage location of the third data; and
respond, by the processing circuit, to the search request with the storage location for the third data,
wherein the storage location for the third data is reported on the object store in response to a determination that at least one copy of the third data exists on the object store, and wherein the storage location for the third data is reported on the archival store in response to a determination that at least one copy of the third data exists on the archival store and not on the object store.

12. The computer program product as recited in claim 8, wherein the embodied program instructions are further executable by the processing circuit to cause the processing circuit to:
receive, by the processing circuit, a request to move the first data from the object store to the archival store;
determine, by the processing circuit, the storage location of the first data within the object store, utilizing the centralized index;
respond, by the processing circuit, to the request with the storage location of the first data within the object store;
receive, by the processing circuit at the centralized index, a third event indicating a storage of the first data within the archival store;
set, by the processing circuit, a timer for maintaining the first data within the object store; and
delete, by the processing circuit, the first data within the object store, in response to an expiration of the timer.

13. The computer program product as recited in claim 8, wherein the embodied program instructions are further executable by the processing circuit to cause the processing circuit to:
receive, by the processing circuit, a request to duplicate the second data within the archival store;
determine, by the processing circuit, the storage location of the second data within the archival store, utilizing the centralized index;
respond, by the processing circuit, to the request with the storage location of the second data within the archival store;
receive, by the processing circuit at the centralized index, a third event indicating a copying of the second data to an additional storage location within the object store;
add, by the processing circuit to the normalized metadata in the centralized index, the additional storage location of the second data within the object store to the storage location of the second data within the archival store;
receive, by the processing circuit, a search request for the second data;
search, by the processing circuit, the centralized index for the normalized metadata relating to a storage location of the second data; and
respond, by the processing circuit, to the search request with the additional storage location within the object store, in response to determining that at least one copy of the second data exists within the object store.

14. The computer program product as recited in claim 8, wherein the embodied program instructions are further executable by the processing circuit to cause the processing circuit to:
receive, by the processing circuit, a request to move the first data from the object store to the archival store;
determine, by the processing circuit, the storage location of the first data within the object store, utilizing the centralized index;
respond, by the processing circuit, to the request with the storage location of the first data within the object store;
receive, by the processing circuit at the centralized index, a third event indicating a storage of the first data within the archival store;
set, by the processing circuit, a timer for maintaining the first data within the object store;
delete, by the processing circuit, the first data within the object store, in response to an expiration of the timer;
receive, by the processing circuit, a request to duplicate the second data within the archival store;

determine, by the processing circuit, the storage location of the second data within the archival store, utilizing the centralized index;

respond, by the processing circuit, to the request with the storage location of the second data within the archival store;

receive, by the processing circuit at the centralized index, a third event indicating a copying of the second data to an additional storage location within the object store;

add, by the processing circuit to the normalized metadata in the centralized index, the additional storage location of the second data within the object store to the storage location of the second data within the archival store;

receive, by the processing circuit, a search request for the second data;

search, by the processing circuit, the centralized index for the normalized metadata relating to a storage location of the second data; and respond, by the processing circuit, to the search request with the additional storage location within the object store, in response to determining that at least one copy of the second data exists within the object store.

15. A system, comprising:
a processing circuit;
a memory; and
logic stored to the memory, that when executed by the processing circuit causes the processing circuit to:
receive, by the processing circuit via a messaging bus at a centralized index operating in a cloud environment, a first event indicating an action performed on first data within an object store accessible via the cloud environment;

receive, by the processing circuit at the centralized index, a second event indicating an action performed on second data within an archival store separate from the object store that is accessible via the cloud environment, where the object store and the archival store operate in different object subsystems of the cloud environment;

normalize, by the processing circuit, metadata in the first event and the second event to correspond to a single namespace across the different object subsystems; and index and store, by the processing circuit, the normalized metadata in the centralized index, where the normalized metadata includes the action performed on the first data, a storage location of the first data within the object store, the action performed on the second data, and a storage location of the second data within the archival store.

* * * * *